United States Patent [19]

Schlosser

[11] Patent Number: 5,304,103
[45] Date of Patent: Apr. 19, 1994

[54] PINION MATE RETAINING ASSEMBLY

[75] Inventor: Kraig J. Schlosser, Fort Wayne, Ind.

[73] Assignee: Dana Corporation, Toledo, Ohio

[21] Appl. No.: 989,269

[22] Filed: Dec. 11, 1992

[51] Int. Cl.$^5$ ............................................. F16H 1/38
[52] U.S. Cl. ................................................. 475/230
[58] Field of Search ......................................... 475/230

[56] References Cited

U.S. PATENT DOCUMENTS

| | | |
|---|---|---|
| 1,736,836 | 11/1929 | Rayburn . |
| 2,064,152 | 12/1936 | Conboy . |
| 2,206,907 | 7/1940 | Loughridge . |
| 2,209,966 | 8/1940 | Goeller . |
| 2,415,293 | 2/1947 | Le Tourneau . |
| 2,762,240 | 9/1956 | Eckert . |
| 3,653,280 | 4/1972 | Koskela . |
| 4,125,026 | 11/1978 | Torii et al. . |
| 4,304,317 | 12/1981 | Vanzant et al. ................. 475/230 X |
| 4,455,889 | 6/1984 | Hauser . |
| 4,543,854 | 10/1985 | Roth ................................ 475/230 X |
| 4,959,043 | 9/1990 | Klotz et al. . |

Primary Examiner—Dirk Wright
Attorney, Agent, or Firm—Dykema Gossett

[57] ABSTRACT

A retaining cap for the shaft of a differential gear assembly retains the pinion gear without support from a case structure. The retaining cap is self-supported, and may be retained on a single shaft by a weld, a force fit arrangement, or by a rivet. The retaining cap is capable of retaining the pinion gear under high loads, and simplifies the differential assembly by allowing construction without the case structure.

14 Claims, 2 Drawing Sheets

PINION MATE RETAINING ASSEMBLY

BACKGROUND OF THE INVENTION

The present invention relates to differential gear assemblies, and more particularly to retaining a differential pinion gear on a shaft.

An interaxle differential gear assembly allows an output drive axle to rotate at a different speed than an input drive axle. One type of differential assembly transmits torque from the input drive axle to the output drive axle by rotating a case surrounding a pinion gear assembly. This type is known as a "case driven" differential.

Case driven differentials are a distinct class of differentials that transfer torque by rotation of the case surrounding the differential assembly. Torque is transferred to the pinion gear shaft at a portion of the shaft radially outwardly of the pinion gear. The entire torque load is generally carried by the case. With the case driven differential, the pinion gear is generally retained on its shaft by the case, or by a structure in combination with the case.

In the heavy duty environment, a four pinion gear assembly is generally required in order to transmit substantial amounts of torque through a case driven differential. The four pinion gear assembly distributes the torque over the four pinion gears to reduce tooth stress load on the gears. The pinion gears are generally positioned on a cross-shaped shaft and in a meshing arrangement between a pair of side gears.

A "center driven" differential transmits torque directly to the center of a differential assembly, and generally directly rotates the pinion gear shaft, as opposed to rotating a case. With the center driven differential, the entire torque load is generally carried by the pinion gear shaft.

The prior art methods to retain the pinion gears on its shaft for center driven differentials have utilized a case to provide additional support to retain the pinion gears. Additionally, it is known in the art to use a threaded cap which is received upon a threaded shaft, or to use a snap ring to retain a pinion gear to a shaft. Under high loads, however, both methods are inadequate to retain the pinion gear. A case or other structure is therefore required to assist in retaining the pinion gear on the shaft when the pinion gearing is subjected to high loads. This case is undesirable and adds additional material to the differential, increasing both weight and expense. Further, access to the pinion gears for lubrication is limited. Also, the case reduces the space available for the gears, thus limiting the size of the gears.

SUMMARY OF THE INVENTION

The present invention provides a simplified means to retain the pinion gear in a center driven differential assembly that eliminates the required case.

A retaining cap secures a single pinion gear on its shaft, retaining the pinion gear even under extreme loads. The retaining cap is self-supported on the shaft of a differential cross, and requires no additional support from the case. With this arrangement, assembly is simplified, a case is not required, and lubricants can easily reach the pinion gears.

The retaining cap may be non-removably fixed to the shaft in any one of several ways. Disclosed retaining caps are welded, force fitted, or riveted to the shaft. The non-removable securement is to be contrasted to the prior art threaded nut connections, which turn on the shaft and become loose. The contacting surfaces between the retaining caps and the pinion gear may also be curved for improved wear.

These and other features of the present invention can best be understood from the following specification and drawings, of which the following is a brief description.

DETAILED DESCRIPTION OF A PREFERRED EMBODIMENT

Figure 1:
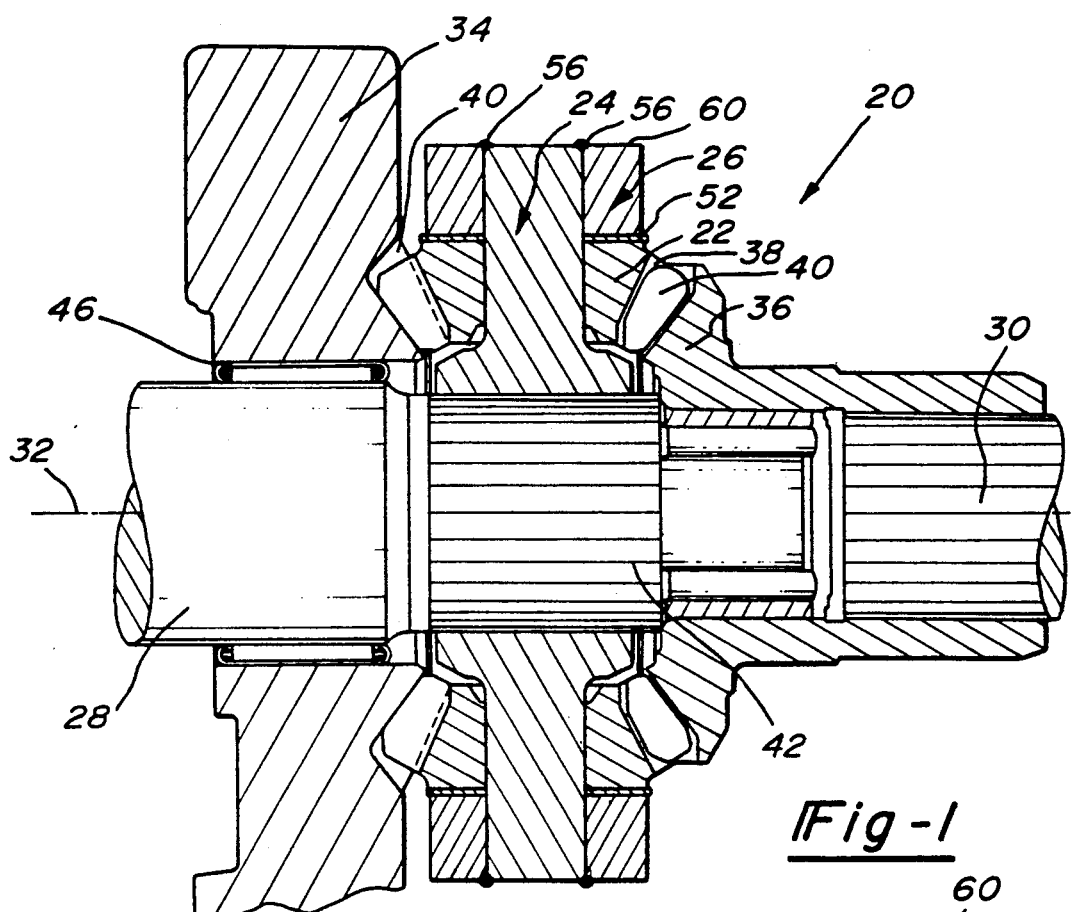
FIG. 1 is a cross-sectional view of a center driven differential gear assembly.

FIG. 1 illustrates an inter-axle differential assembly 20 according to the present invention. The differential assembly 20 includes four pinion gears 22 mounted on a differential frame 24, known also as a differential cross or "spider". Rotation is transmitted directly to the center of differential frame 24. Each pinion gear 22 is retained on differential frame 24 by a self-supported retaining cap 26. By "self-supporting" applicant means that retaining cap 26 is supported only by differential frame 24. Retaining cap 26 is fixed to differential frame 24, and is unsupported by a case or any other member of differential assembly 22. Additionally, retaining cap 26 alone sufficiently retains pinion gear on shaft 50, even under high loads. Therefore, the axial outer surface 27 of the pinion gear is also unsupported.

Rotation is transmitted from an input drive axle 28 and ultimately to an output drive axle 30. Drive axles 28 and 30 rotate about a drive axis 32. Side gears 34 and 36 are supported about drive axles 28 and 30, respectively. Disposed between side gears 34 and 36 are pinion gears 22, that mesh with side gears 34 and 36. Differential frame 24 is rotationally fixed to input drive axle 28, while side gear 34 is slidingly mounted to input drive axle 28. Additionally, side gear 36 is rotationally fixed to output drive axle 30.

Pinion gears 22 have a beveled construction interfacing with mating beveled side gears 34 and 36. The pinion gears 22 mesh with side gears 34 and 36 to allow input drive axle 28 to rotate at a different rate than output drive axle 30. Teeth 38 of pinion gear 22 mesh with corresponding teeth 40 on both side gears 34 and 36. Input drive axle 28 includes exterior splines 42 and differential frame 24 includes complimentary interior splines 44. Exterior splines 42 are received within interior splines 44, preventing rotation of differential frame 24 relative to input drive axle 28.

Side gear 34 is supported about input drive axle 28 by a needle bearing 46. Although needle bearing 46 is shown, a bushing could also be used in applications that require lower load limits. Side gear is coupled with output drive axle 30 by a spline arrangement, similar to that described for frame 24 and input drive axle 28.

Figure 2:
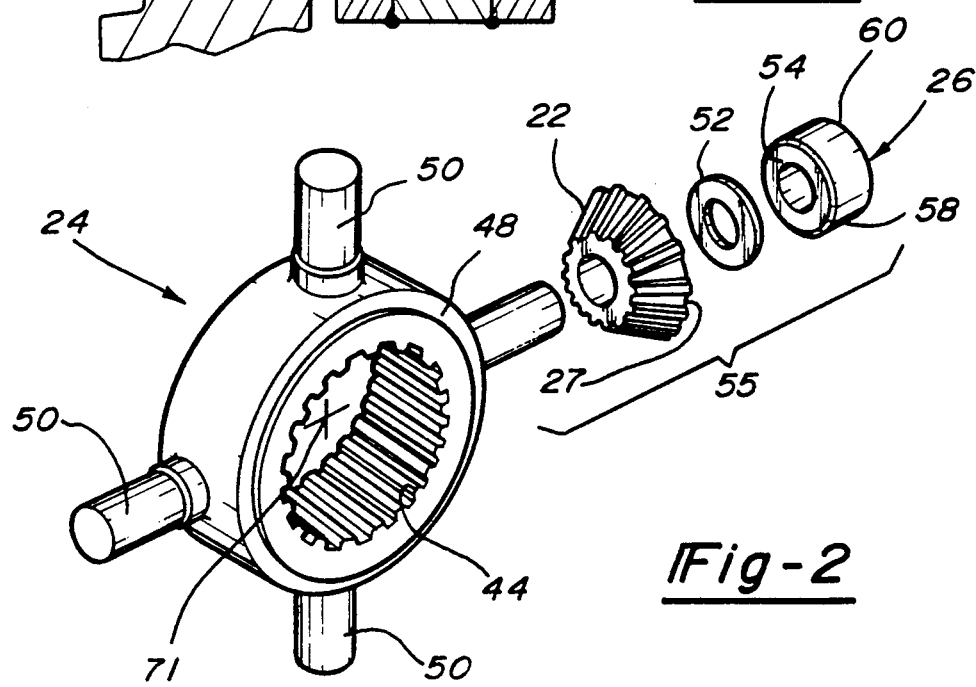
FIG. 2 is an exploded perspective view of a portion of the assembly shown in FIG. 1.

Referring now to FIG. 2, differential frame 24 includes a center hub 48 and four stub shafts 50. Each stub shaft 50 extends radially outwardly of center hub 48. The axis of each stub shaft 50 extends radially from drive axis 32 (see FIG. 1), and each stub shaft axis lies in a plane disposed perpendicular to drive axis 32. Retaining cap 26 is secured at a radially outer end of stub shaft 50 to retain pinion gear 22. An optional washer 52 may be disposed between retaining cap 26 and pinion gear 22 to reduce wear on surface 54 of retaining cap 6, otherwise in facial engagement with axial outer surface 27 of pinion gear 22. Pinion gear 22, washer 52 and retaining cap 26 form a differential subassembly 55.

In a first embodiment of the invention, retaining cap 26 is non-removably fixed to stub shaft 50 by being welded 56 to an outer portion of stub shaft 50. Neither pinion gear 22 nor retaining cap 26 is supported by a case, as in the prior art. Thus, differential assembly 20 is constructed without a case, simplifying assembly and reducing amount of material used. Additionally, the outer peripheral surface 58 and axial end surface 60 of retaining cap 26 are free of any contact with any structure of differential assembly 20, so as to provide unencumbered lubrication clearances for pinion gears 22.

Figure 3:
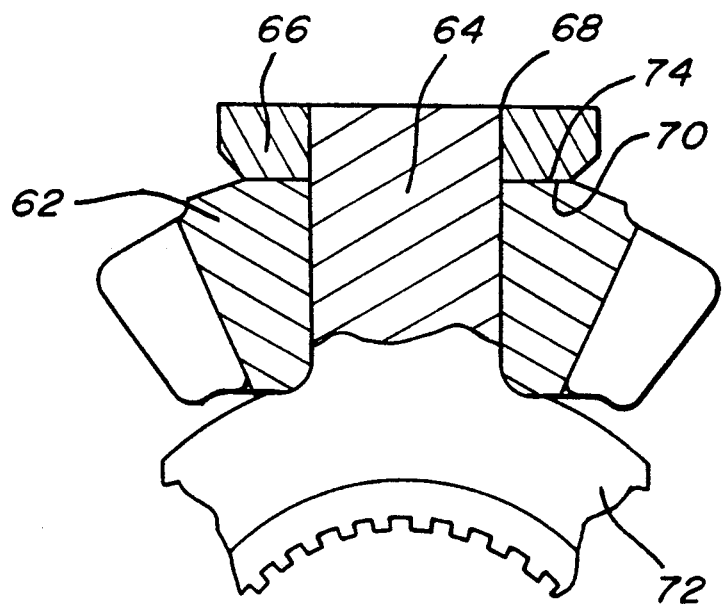
FIG. 3 is a fragmented cross-sectional view of a second embodiment of the present invention.

FIG. 3 illustrates a second embodiment of the present invention. A pinion gear 62 is non-removably retained on stub shaft 64 by a retaining cap 66 using a force fit. Retaining cap 66 includes a circular aperture 68 with a diameter slightly less the diameter of stub shaft 64. Stub shaft 64 receives retaining cap 66 under pressure creating the force fit. Retaining cap 66 is self-secured and retains pinion gear 62 even under high loads.

As an additional feature, contacting surfaces between retaining cap 66 and pinion gear 62 are curved. Retaining cap 66 includes an interior surface 70 which has a substantially spherical curvature extending radially about the geometric centroid 71 of differential frame 72. Pinion gear 62 has a matching curvature along its radially outermost surface 74 in facial engagement with retaining cap 66.

Figure 4:
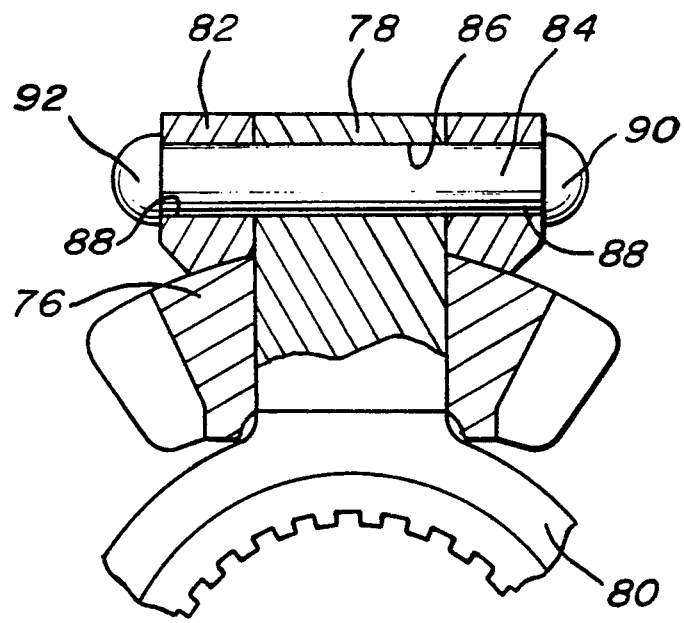
FIG. 4 is a fragmented cross-sectional view of a third embodiment of the present invention.

FIG. 4 illustrates a third embodiment of the present invention. A pinion gear 76 is non-removably retained on stub shaft 78 of differential frame 80 by a retaining cap 82. Retaining cap 82 is secured by a self-supported rivet 84 which extends through stub shaft 78. Stub shaft 78 includes an aperture 86, and retaining cap 82 includes aligning apertures 88. Rivet 84 includes a head 90 on one proximate end of rivet and is inserted through aligning apertures 86 and 88, until head 90 contacts retaining cap 82. A tail 92 is then formed on the opposing end to secure rivet 84. In applications that require lower load limits, a pin may be substituted for rivet 84.

In the second and third embodiments, contact surfaces between a pinion gear and its respective retaining cap are shown curved. It should be understood that flat contact surfaces could be used, with or without a washer. Further, the welded first embodiment could also incorporate such curved surfaces.

Preferred embodiments of the present invention have been disclosed. A worker of ordinary skill in the art, however, would recognize that certain modifications would come within the scope of this invention. For that reasons the following claims should be studied in order to determine the true scope and content of this invention.

I claim:

1. A differential assembly for a vehicle axle, comprising:
   a differential frame having a center hub plurality of stub shafts extending radially outwardly of said center hub;
   a pinion gear received upon each of said stub shafts, said pinion gears being rotatable about said stub shafts; and
   a retaining cap force fitted to an end of each of said stub shafts, each pinion gear being disposed on one of said stub shafts between said center hub of said differential frame and said retaining cap, each retaining cap being solely supported by said differential frame and having a free outer peripheral surface and a free axial end surface.

2. The differential assembly of claim 1, wherein each of said retaining caps contact a corresponding stub shaft of said differential frame via an aperture formed in said retaining cap.

3. The differential assembly recited in claim 1, wherein a washer is disposed between said pinion gear and said retaining cap.

4. The differential assembly recited in claim 1, wherein said retaining cap includes an interior surface in facial engagement with said pinion gear, said interior surface having a substantially spherical curvature extending radially outwardly from a centroid of said differential frame, said pinion gear including a matching curvature along the surface in facial engagement with said retaining cap.

5. The differential assembly of claim 1, wherein said stub shafts and said retaining caps have aligned apertures, and a rivet extends through said apertures.

6. A differential system, comprising
   an input axle transmitting rotation, said input axis including a first side gear slidingly secured to said input axle;
   a differential frame having a hub and a plurality of stub shafts extending radially outwardly of said hub, said hub being fixed to said input axle, said input axle adapted to directly rotate a center portion of said differential frame;
   a pinion gear received upon each of said stub shafts, said pinion gear being rotatable about an axis of said stub shaft;
   an output axle including a second side gear fixed to said output axle, said first side gear of said input axle and said second side gear of said output axle meshing with said pinion gears to transmit rotation from said input axle to said output axle; and
   a retaining cap permanently fixed to an end of each of said stub shafts, said pinion gear being disposed between said center hub of said differential frame and said retaining cap, said retaining cap being directly secured to said stub shaft, said retaining cap having an outer peripheral surface and an axial end surface which are free.

7. The differential system recited in claim 6, wherein said retaining caps at said axial end surface and said outer peripheral surface do not contact any structure of said differential assembly.

8. The differential system recited in claim 6, wherein said retaining cap is secured by a weld applied to said retaining said stub shaft, such that said retaining cap retains said pinion gear on said stub shaft.

9. The differential system recited in claim 6, wherein said stub shaft is circular having a diameter of a first dimension, and said retaining cap includes a circular aperture of a second dimensions said second dimension being slightly less than said first dimension such that said stub shaft is forced to receive said retaining cap under pressures and said retaining cap retaining said pinion gear on said stub shaft.

10. The differential system recited in claim 6, wherein said stub shaft extends along an axis, said stub shaft including an aperture generally perpendicular to said axis, and said retaining cap including aligning apertures, a rivet inserted through said aligning apertures to secure said retaining cap and said pinion gear on said stub shaft.

11. The differential system recited in claim 6, wherein contacting surfaces between said retaining cap and said pinion gear are flat.

12. The differential system recited in claim 11, wherein a washer is disposed between said pinion gear and said retaining cap.

13. The differential system recited in claim 6, wherein said retaining cap 3 includes an interior surface in facial engagement with said pinion gear, said interior surface having a substantially spherical curvature extending radially outwardly from a centroid of said differential frame, said pinion gear including a matching curvature along the surface in facial engagement with said retaining cap.

14. A differential assembly for a vehicle axle, comprising:
- a differential frame having a center hub and a plurality of stub shafts extending radially outwardly of said center hub;
- a pinion gear received upon each of said stub shafts, said pinion gears being rotatable about said stub shafts; and
- a retaining cap welded to an end of each of said stub shafts, each pinion gear being disposed on end of said stub shafts between said center hub of said differential frame and said retaining cap, each retaining cap being solely supported by said differential frame and having a free outer peripheral surface and a free axial end surface.

* * * * *

UNITED STATES PATENT AND TRADEMARK OFFICE
CERTIFICATE OF CORRECTION

PATENT NO. : 5,304,103

DATED : April 19, 1994

INVENTOR(S) : Kraig J. Schlosser

It is certified that error appears in the above-identified patent and that said Letters Patent is hereby corrected as shown below:

Column 3, line 63, after "hub" insert --and a--;

Column 4, line 27, delete "axis" and insert therefor --axle--;

Column 4, line 56, after "retaining" (first occurrence) insert --cap and--;

Column 4, line 61, delete "dimensions" and insert therefor --dimension,--;

Column 4, line 64, delete "pressures" and insert therefor --pressure,--;

Column 5, line 13, delete "3";

Column 6, line 12, delete "end" and insert therefor --one--.

Signed and Sealed this

Twenty-third Day of August, 1994

Attest:

BRUCE LEHMAN

Attesting Officer

Commissioner of Patents and Trademarks